Nov. 4, 1969  P. W. HILLSETH  3,475,861
AIRCRAFT HANGAR AND DOOR STRUCTURE ASSOCIATED THEREWITH
Filed Aug. 3, 1967  3 Sheets-Sheet 3
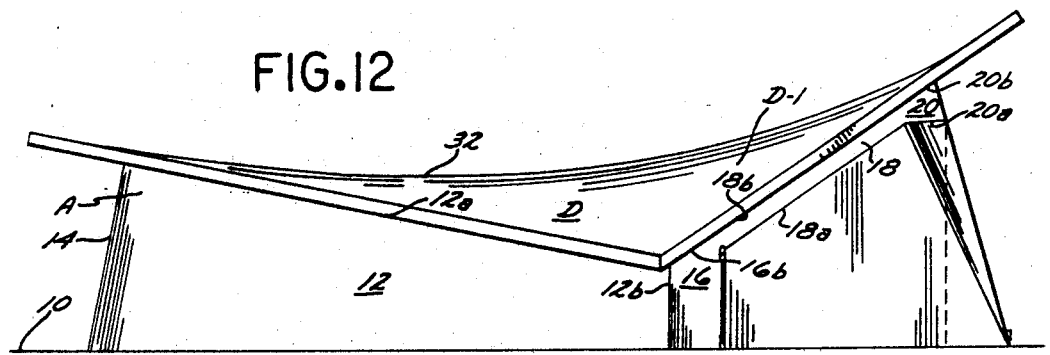
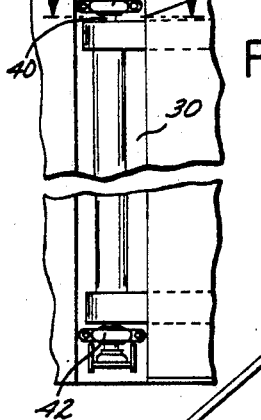
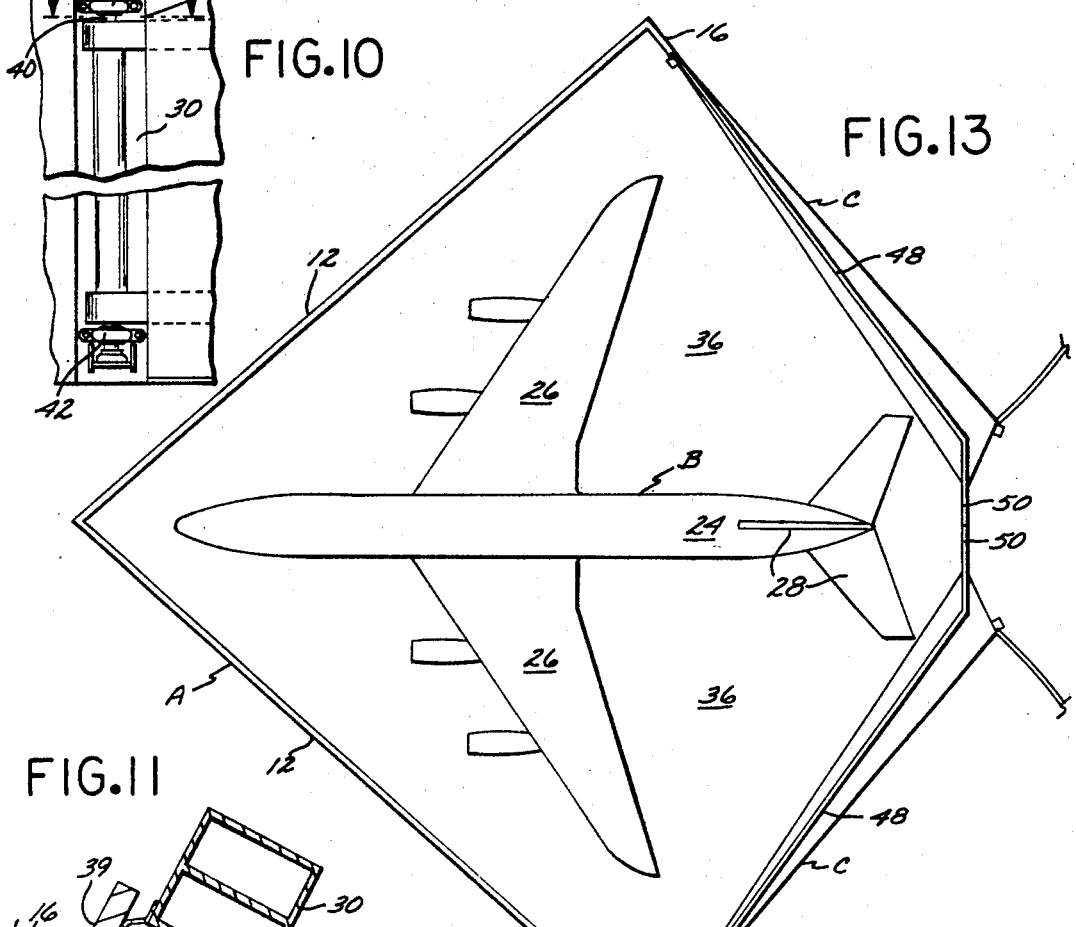
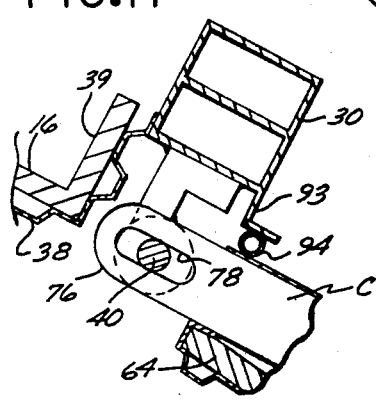
INVENTOR.
PAUL W. HILLSETH
BY
William G. Babcock
ATTORNEY United States Patent Office 3,475,861
Patented Nov. 4, 1969

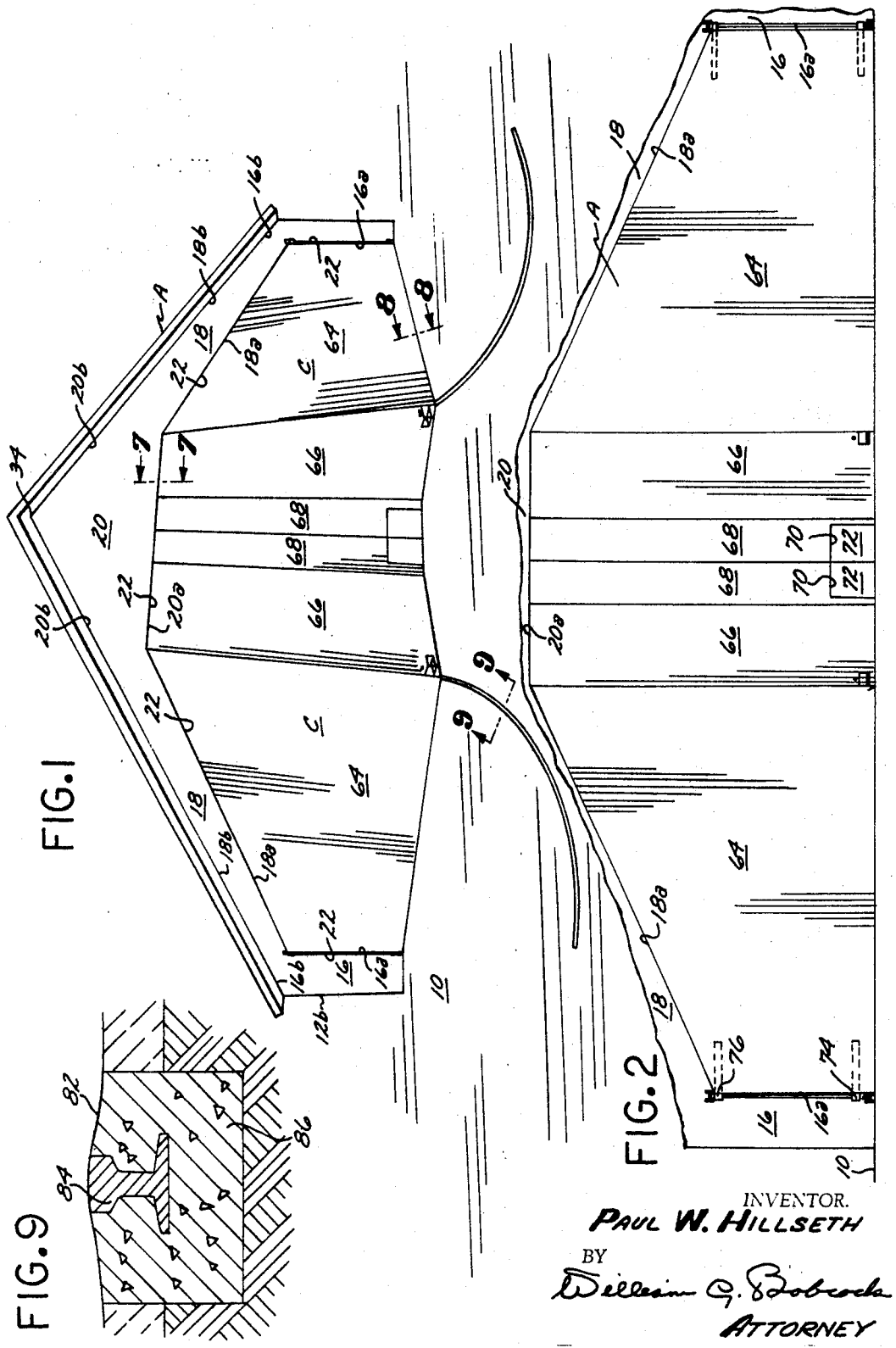

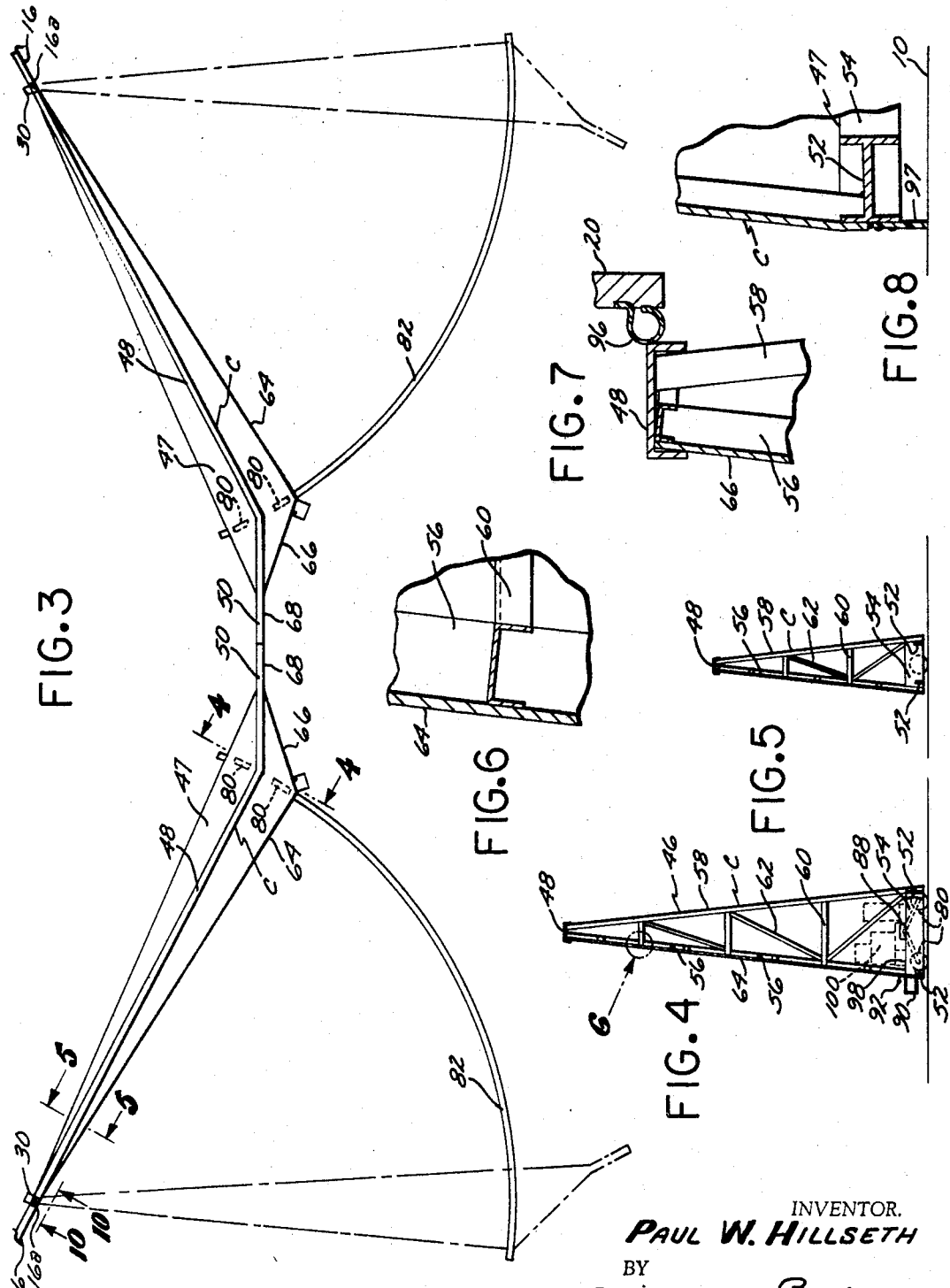

3,475,861
AIRCRAFT HANGAR AND DOOR STRUCTURE
ASSOCIATED THEREWITH
Paul W. Hillseth, 1937 W. 169th St.,
Gardena, Calif. 90247
Filed Aug. 3, 1967, Ser. No. 658,103
Int. Cl. E05f 15/12; E04b 1/342
U.S. Cl. 49—358          5 Claims

ABSTRACT OF THE DISCLOSURE

An aircraft hangar that minimizes the enclosed space required to house a plane of predetermined maximum length, width and height for the purpose of conserving the heat required to maintain the interior of the hangar at a desired temperature as well as the electrical energy necessary to air condition the hangar interior to a like temperature, together with a door structure that is particularly adapted for use with such a hangar to obstruct communication between the interior of the hangar and the ambient atmosphere.

BACKGROUND OF THE INVENTION

Field of the invention

The present invention relates generally to the field of building structures, and more particularly to an aircraft hangar and door structure for use therewith.

Description of the prior art

In the past, aircraft hangars generally have been rectangular, and due to the configuration of an aircraft housed therein, the hangar provided an enclosed space of substantially greater volume than that required to house the craft. Such excess space is undesirable from an economic standpoint due to the cost of heating or cooling the same in maintaining the interior of the hangar at a desired temperature.

As the size of commercial aircraft have increased, so have aircraft hangars, and heretofore the volume of waste space in such large hangars has been of such magnitude that the heating and cooling thereof becomes a matter of major concern. In addition, as the size of hangars has increased, the entries provided therein through which aircraft pass have likewise increased. This increased size of entryways also presents a major problem as to door structures that can be used to close the same to efficiently obstruct communication between the hangar interiors and the ambient atmosphere, and yet which may be moved between open and closed positions in a relatively short period of time.

The aircraft hangar hereinafter described provides a housing for large commercial aircraft that minimizes not only the square footage required on which it is built, but the waste space within the confines of the hangar. Minimizing such waste space is highly desirable from an economic standpoint, for it reduces the cost of fuel and electrical energy used in heating and air conditioning the hangar interior. The door structure used in conjunction with the hangar of the present invention permits easy and efficient closing of the access opening therein through which large commercial craft are moved, and when the door is closed it seals the hangar whereby a minimum flow of the air between the interior of the hangar and the ambient atmosphere on the exterior thereof occurs.

SUMMARY OF THE INVENTION

The present invention comprises an aircraft hangar of such configuration that both the square footage on which the hangar is built, and the waste space within the hangar are minimized, resulting in the saving of real estate cost as well as operating expense in maintaining the interior of the hangar at a predetermined temperature. The hangar also includes a door structure that permits the access opening therein to be closed within a relatively short time, and when closed, it seals the hangar and minimizes the flow of air between the hangar interior and the ambient atmosphere.

A major object of the present invention is to provide an aircraft hangar and associated door structure which substantially overcomes the operational disadvantages common to the design of prior hangars, and minimizes both the square footage required for the hangar as well as the power costs involved in maintaining the hangar interior at a predetermined temperature.

Another object of the invention is to supply a door structure which when arranged in pairs is particularly adapted for closing a large entryway in a building, and also be moved between opened and closed positions without subjecting the building in which it is installed to any substantial strain.

BRIEF DESCRIPTION OF THE DRAWING

FIGURE 1 is a front perspective view of an aircraft hangar, showing two door structures in a closed position, and the curved tracks that partially support the door structures positioned in front of the hangar;

FIGURE 2 is a front elevational view of the hangar;

FIGURE 3 is a top plan view of the door structures;

FIGURE 4 is a vertical cross-sectional view of one of the two door structures, taken on the line 4—4 of FIGURE 3;

FIGURE 5 is another vertical cross-sectional view of one of the door structures, taken on the line 5—5 of FIGURE 3;

FIGURE 6 is a fragmentary, enlarged, vertical cross-sectional view of that portion of one of the door structures shown within the circle in phantom line in FIGURE 4;

FIGURE 7 is a fragmentary, enlarged, vertical cross-sectional view of a portion of one of the door structures, taken on the line 7—7 of FIGURE 1;

FIGURE 8 is a fragmentary, enlarged, vertical cross-sectional view of a portion of one of the door structures, taken on the line 8—8 of FIGURE 1;

FIGURE 9 is a vertical cross-sectional view of one of the tracks and ground-embedded support therefor;

FIGURE 10 is a front elevational view of one of the pivotal supports for one of the door structures, taken on the line 10—10 of FIGURE 3;

FIGURE 11 is a horizontal cross-sectional view of one of the pivotal door supports, taken on the line 11—11 of FIGURE 10;

FIGURE 12 is a side elevational view of the hangar; and

FIGURE 13 is a top plan view of the two door structures in a closed position, the walls of the hangar, and an aircraft disposed within the confines of the walls.

DESCRIPTION OF THE PREFERRED EMBODIMENT

The hangar A, as may best be seen in FIGURES 1, 2, 12 and 13, is supported on a level expanse of ground 10, and includes two angularly disposed rear walls 12 joined at the rear edges thereof to define an upwardly extending junction 14.

Two laterally spaced forward walls 16 are provided that are angularly disposed relative to the rear wall 12 and joined to the forward extremities thereof, as shown in FIGURE 13. Two-elongate, relatively narrow forward wall extensions 18 project upwardly towards one another from the upper portions of the forward walls 16, with the extensions 18 merging into a central upper forward wall 20 best shown in FIGURE 1.

The adjacent vertical edges 16a of forward walls 16, and the lower edges 18a and 20a of extensions 18 and central wall 20 cooperatively define an entryway 22 (FIGURE 1) in the forward portion of hangar A through which an aircraft B of not greater than a predetermined maximum fuselage length, wing span, and tail structure height can be moved. Normally the aircraft B housed in the present invention is of the commercial transport type embodying a fuselage 24, wing 26, and tail structure 28, such as illustrated in FIGURE 13.

Two heavy vertical columns 30 of structural steel are supported by suitable footings (not shown) adjacent the edges 16a of forward walls 16 as shown in FIGURE 3. Columns 30 are used to partially support two pivotally movable door structures C as will later be explained in detail, which can pivot from a first closed position in solid line in FIGURE 3 to a second open position illustrated in phantom line in the same figure.

Hangar A includes a roof D that has a longitudinally extending convex ridge 32 as may be seen in FIGURE 12 that projects forwardly from the upper portion of the junction 14 to bisect the upper part of central wall 20. Roof D on each side of ridge 32 slopes downwardly towards the downwardly and forwardly extending upper edges 12a of the rear walls 12. The forward vertical edges 12b of the rear walls 12 are substantially one-half the height at the junction 14 thereof.

From the ridge 32, roof D slopes downwardly from each side thereof towards the upwardly extending upper edges 16b and 18b of forward walls 16 and extensions 18 as illustrated in FIGURE 12. The roof D is also connected to the two upwardly extending upper edges 20b of central wall 20. Edges 20b meet at the upper extremities thereof (FIGURE 1) to define an apex 34 located at the upper center of wall 20. Roof D, may be seen in FIGURE 12, extends rearwardly of junction 14 and forwardly of central wall 20.

The portion D–1 of the roof D forwardly of the edges 16a cooperate with the extensions 18 and central wall 20 to define a cantilever structure which overhangs the aircraft tail structure 28 and that portion of fuselage 24 adjacent thereto as best shown in FIGURE 13, whether the doors C are open or closed.

From the above description of the hangar A it will be seen that an enclosed level floor area 36 is provided that is diamond-shaped (FIGURE 13), with a truncated forward apex portion. Due to this configuration of the floor and the wall-defined portion of the hangar A, as well as the shape of the roof D and doors C, the enclosed space in the hangar required to house the aircraft B is substantially reduced over that required to house a craft of the same size if a conventional rectangular hangar (not shown) is used. This reduction in enclosed space required to house craft B is of the utmost economic importance, as the costs of heating or cooling the hangar interior to maintain the same at a desired temperature is substantially reduced.

The walls 12, 16, extensions 18 and central wall 20 are fabricated from conventional steel framing (not shown) that support sheathing 38, preferably vertically corrugated type as shown in FIGURE 11. The vertical edge 16a of each of the forward walls 16 is a vertical structural member 39 such as shown in FIGURE 11 around which the sheathing 38 extends to be connected to one of the columns 30 by welding or the like. This construction prevents the flow of air between the interior of the hangar A and the ambient atmosphere when the doors C are closed.

Two heavy vertical rods 40 are disposed forwardly of the columns 30 as shown in FIGURES 10 and 11. Each rod 40 is rotatably supported on the lower end thereof by a thrust bearing assembly 42 affixed to that column 30 most adjacent thereto. The upper end of each rod 40 is rotatably supported by a bearing assembly 44 affixed to that column 30 most adjacent thereto.

Each of the doors C is defined by an open steel framework 46 as shown in FIGURES 3 to 7 inclusive, that includes an upper, downwardly and outwardly sloping channel 48, the inner end of which merges with a horizontal channel 50. When the doors C are in a closed position as shown in FIGURES 1 to 3, the channels 50 thereof lie in the same horizontal and vertical planes.

Each framework 46 includes a horizontal triangular 47 base as shown in FIGURES 3 and 8, that is defined by two angularly disposed beams 52 connected by spaced transverse members 54. A number of longitudinally spaced rigid members 56 as shown in FIGURES 4 and 5 project upwardly and rearwardly from the forwardly disposed beam 52 in each door C, and are welded or otherwise secured to the beam 48 of that door. Each door C is also provided with a number of rigid members 58 extending upwardly and forwardly from the rear beam 52 to the channel 48 to which they are joined, as illustrated in FIGURES 4 and 5. The members 56 and 58 on each door C are transversely aligned, and joined by horizontal reinforcing members 60 and angularly positioned reinforcing members 62.

Each door C includes first and second flat upwardly extending panels 64 and 66 which are secured to the members 56 (FIGURES 4 and 5). Each second panel 66 is angularly disposed relative to the panel 64 most adjacent thereto. The lower portion of each panel 66 extends horizontally from the forward extremity of panel 64 to an intermediate position below the channel 50 as shown in FIGURE 3. A third rectangular panel 68 extends downwardly from the channel 50 of each door C (FIGURES 1 to 3) to a lower channel (not shown) extending from the triangular base 47.

Two adjacently disposed rectangular openings 70 are formed in the lower parts of the rectangular panels 68, as shown in FIGURES 1 and 2, that are normally closed by pivotally supported doors 72. A person may enter or leave hangar A by means of doors 72 without movement of the doors C.

Each of the doors C has a lower hinge member 74 (FIGURE 2) projecting outwardly therefrom towards the column 30 most adjacent thereto. Each hinge member 74 engages one of the rods 40 in a fixed vertical position thereon whereby part of the weight of the door is transferred through the lower portion of the rod to the thrust bearing 42 associated with that particular rod.

Each door C is provided with elongate upper hinge members 76 projecting outwardly therefrom towards the columns 30, and an elongate, longitudinally extending slot 78 is formed in each member 76 that both pivotally and slidably engages the rod 40 most adjacent thereto, as shown in FIGURE 11.

A set of transversely spaced rollers 80 are rotatably mounted on the lower portions of each door C a substantial distance from the rod 40 about which that particular door pivots. Two oppositely curved track assemblies 82 are provided which extend forwardly from the hangar A as shown in FIGURE 1, and one of the sets of rollers 80 rests on each track assembly. Each set of rollers 80 and the track assembly 82 on which they rest are of the same radius of curvature. Each track assembly 82 is preferably constructed by embedding substantially all but the upper surface of a horizontally curved railroad rail 84 in a body of concrete 86 that in turn is buried in the ground in front of the hangar A in the manner shown in FIGURE 9.

Power means 88 (FIGURE 4) are mounted on each of the doors C for driving the rollers 80 either rearwardly or forwardly to permit the doors to move to either the first closed position shown in solid line in FIGURE 1 or the second open position illustrated in phantom line in the same figure. A platform 90 projects forwardly from each of the doors C on which an operator stands as the doors are moved to either the open or closed position. A control 92 for regulating the speed of operation of the power means 88 is mounted on each platform 90.

Angle irons 93 are secured to columns 30 as shown in FIGURE 11, and resilient tubular members 94 are affixed thereto. The members 94 are pressure-contacted when doors C are in closed positions, and serve as seals to prevent the flow of air between the interior of hangar A and the ambient atmosphere when the doors are closed. Resilient tubular members 96 are secured to the lower exterior surface portions of wall extensions 18 and central wall 20 as shown in FIGURE 7, and also serve as seals when pressure-contacted by the doors C when closed. Elongate strips 97 depend from the forwardly disposed beams 52, as shown in FIGURE 8, and terminate just above the ground surface 10 to minimize the flow of air between the ambient atmosphere and the interior of the hangar A when the doors C are in the closed position.

Operation of the hangar A and the associated doors C is relatively simple. The weight of each door C is supported between one of the sets of rollers 80 on one of the track assemblies 82, and the thrust bearing 42 associated with each door. When it is desired to move the doors to either a first closed position or second open position, the power-driven rollers 80 are actuated by power means 88 to cause the rollers to travel over the tracks. Any irregularities in the elevation of the upper surfaces of the rails 84 would tend to cause the doors C to pivot in vertical planes relative to the rods 40 as the doors pivot between open and closed positions, whereby severe strains are placed on the rods and columns 30 supporting the same. However, the slots 78 permit the doors C to pivot in vertical planes in which the rods 40 lie without subjecting the rods 40 and supporting columns 30 to any substantial strain. Due to the configuration of the floor area 36, as well as that of the walls 12, 16, extensions 18, central wall 20 and roof D, the space within the hangar A to house craft B is minimized with a consequent saving in the costs of maintaining the heating and cooling of the hangar temperature at a predetermined degree.

It will be particularly noted that in the structure of the hangar A described herein, the doors C serve the dual function of both closing the hangar, and in conjunction with the cantilever roof portion D-1, partially providing the housing for the aircraft B. The interior of the hangar A may be heated or cooled by conventional equipment to maintain the temperature at a predetermined degree. Should it be desired, flat platforms 98 may extend between beams 52 on which material 100 may be stored for use in connection with the maintenance of the aircraft B.

I claim:

1. A ground-supported aircraft hangar characterized by an independently supported closure for closing and sealing an opening in said hangar through which an aircraft may be moved in and out of said hangar, which closure includes:
 (a) two laterally spaced, independent footing-supported vertical columns on opposite sides of said opening, to the outer edge surfaces of which columns adjacent wall portions of said hangar are sealed;
 (b) two vertical rigid members secured to adjacently disposed vertical edge portions of said columns;
 (c) two vertical first resilient sealing members secured to the forward faces of said rigid members;
 (d) a second resilient horizontal sealing member affixed to the lower extremity of a wall portion of said hangar above said opening;
 (e) two vertical rods disposed forwardly of said columns;
 (f) two thrust bearings affixed to said columns that support the lower ends of said rods;
 (g) first means for maintaining the upper portions of said rods in fixed positions relative to said columns;
 (h) two arcuate, oppositely curving ground-supported tracks located in front of said hangar;
 (i) two doors of such size as to completely close said opening when first vertical edge portions of said doors are adjacently disposed and horizontally aligned;
 (j) two lower hinge members affixed to second vertical edge portions of said doors that pivotally engage said rods in fixed vertical positions thereon and through which hinge members, rods, and thrust bearings, and a part of the weight of said doors is transferred to said columns;
 (k) two roller assemblies mounted on the lower portions of said doors that rest on said tracks and transfer a portion of the weight of said doors to said tracks;
 (l) two upper hinge members affixed to said doors above said lower hinge members, in each of which upper hinge members an elongate, horizontally extending slot is formed that pivotally and slidably engages an upper portion of one of said rods to permit limited pivotal movement of said door in a vertical plane toward and away from said rod due to variations in the elevation of said track associated therewith without imposing any appreciable side load on said rod; and
 (m) power means for moving said doors into or from a closed position, which doors when in a closed position are in abutting pressure contact with said first and second resilient members and seal therewith to prevent flow of air from the ambient atmosphere into the interior of said hangar.

2. A closure as defined in claim 1 wherein said track further includes:
 (n) a curved horizontal railway rail; and
 (o) a curved horizontal body of concrete embedded in the ground in front of said building, with said body so supporting said rail that the upper surface of said rail is disposed above the ground surface to cause water to flow away from said rail.

3. A closure as defined in claim 1 wherein said door includes:
 (n) a horizontal open triangular frame that serves as a base;
 (o) a plurality of longitudinally spaced, transversely aligned rigid members which extend upwardly and inwardly from forward and rear side portions of said frame;
 (p) an inclined first elongate structural member connected to the upper ends of said rigid members most adjacent said rod;
 (q) a horizontal second elongate structural member connected to the end of said first structural member most remote from said rod and angularly positioned relative thereto;
 (r) a first panel that extends downwardly from said first structural member over said rigid members to said base;
 (s) a second panel that extends downwardly from a part of said second structural member adjacent said first structural member over said rigid members to a side of said triangular base; and
 (t) a third panel that extends downwardly from that portion of said second structural member not occupied by said second panel, which third panel is rectangular, with said first, second, and third panels being in angular relationship.

4. A closure as defined in claim 3 in which an opening is formed in the lower portion of said third panel, which closure further includes:
 (u) a door movably supported from said third panel for closing said opening.

5. A closure, as defined in claim 1, wherein said power means drives said roller means, which closure further includes:
   (n) two horizontal platforms projecting outwardly from said doors adjacent the free edges thereof; and
   (o) control means adjacent said platforms for regulating the speed at which said power means drives said roller means.

References Cited

UNITED STATES PATENTS

| | | | |
|---|---|---|---|
| 879,701 | 2/1908 | Van Tassell | 49—245 |
| 1,508,227 | 9/1924 | Jaray | 52—65 |
| 3,232,806 | 2/1966 | Widmer | 52—80 X |
| 3,261,133 | 7/1966 | Herr et al. | 52—64 X |

FOREIGN PATENTS

| | | |
|---|---|---|
| 125,613 | 5/1919 | Great Britain. |
| 1,141,206 | 12/1962 | Germany. |

FRANK L. ABBOTT, Primary Examiner

SAM D. BURKE, III, Assistant Examiner

U.S. Cl. X.R.

49—366, 396; 52—65, 80, 264